US010832566B2

(12) United States Patent
Lim et al.

(10) Patent No.: US 10,832,566 B2
(45) Date of Patent: Nov. 10, 2020

(54) REMOTE CONTROL APPARATUS, CONTROL METHOD THEREOF AND ELECTRONIC SYSTEM

(71) Applicant: SAMSUNG ELECTRONICS CO., LTD., Suwon-si (KR)

(72) Inventors: Chaeyoung Lim, Suwon-si (KR); Jongkeun Lee, Suwon-si (KR); Minsup Kim, Suwon-si (KR); Jehwan Seo, Suwon-si (KR); Kihyun Song, Suwon-si (KR); Sukhoon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/446,890

(22) Filed: Jun. 20, 2019

(65) Prior Publication Data

US 2020/0005630 A1    Jan. 2, 2020

(30) Foreign Application Priority Data

Jul. 2, 2018   (KR) .......................... 10-2018-0076391

(51) Int. Cl.
*G08B 21/18* (2006.01)
*G08C 17/02* (2006.01)
(Continued)

(52) U.S. Cl.
CPC ............ *G08C 17/02* (2013.01); *H04B 11/00* (2013.01); *H04W 4/80* (2018.02); *H04W 12/003* (2019.01);
(Continued)

(58) Field of Classification Search
CPC ... G08C 17/02; G08C 2201/51; H04W 76/14; H04W 4/80; H04W 12/003; H04B 11/00
See application file for complete search history.

(56) References Cited

U.S. PATENT DOCUMENTS 5,886,753 A * 3/1999 Shinyagaito ............ H04L 29/06
                                                              348/114
8,724,036 B2   5/2014 Seo
(Continued)

FOREIGN PATENT DOCUMENTS

JP   2010-088101      4/2010
KR   10-0481274       4/2005
(Continued)

OTHER PUBLICATIONS

International Search Report and Written Opinion dated Oct. 15, 2019 in counterpart International Patent Application No. PCT/KR2019/007648.
(Continued)

*Primary Examiner* — Munear T Akki
(74) *Attorney, Agent, or Firm* — Nixon & Vanderhye, P.C.

(57) ABSTRACT

A remote control apparatus is provided. The remote control apparatus according to an embodiment includes an inputter comprising input circuitry, a communicator comprising communication circuitry, a microphone, and a processor configured to control the communicator to transmit a first Bluetooth packet requesting an electronic apparatus to output a non-audible sound based on a control command being input through the inputter in a state where the remote control apparatus is not paired, obtain identification information of the electronic apparatus based on the non-audible sound output by the electronic apparatus corresponding to the first Bluetooth packet being received through the microphone, and control the communicator to transmit a second Bluetooth packet including the obtained identification information and a turn-on command to the electronic apparatus.

18 Claims, 9 Drawing Sheets

(51) Int. Cl.
*H04W 76/14* (2018.01)
*H04W 4/80* (2018.01)
*H04W 12/00* (2009.01)
*H04B 11/00* (2006.01)

(52) U.S. Cl.
CPC ........ *H04W 76/14* (2018.02); *G08C 2201/51* (2013.01)

(56) References Cited

U.S. PATENT DOCUMENTS

| | | | |
|---|---|---|---|
| 9,106,337 | B2 | 8/2015 | Jung et al. |
| 9,178,973 | B2 | 11/2015 | Lee et al. |
| 2009/0070696 | A1* | 3/2009 | Belz ............... G06F 3/0489 715/771 |
| 2009/0161027 | A1* | 6/2009 | Hardacker ........... G08C 17/02 348/734 |
| 2010/0056054 | A1 | 3/2010 | Yamato et al. |
| 2013/0057765 | A1* | 3/2013 | Zeleznikar ........ H04N 21/4316 348/570 |
| 2013/0093962 | A1 | 4/2013 | Bruhn et al. |
| 2013/0129358 | A1 | 5/2013 | Jung et al. |
| 2013/0300945 | A1 | 11/2013 | Seo |
| 2015/0103249 | A1* | 4/2015 | Jung ............... H04N 21/42225 348/563 |
| 2015/0120838 | A1 | 4/2015 | Vadla Ravnas |
| 2017/0140593 | A1 | 5/2017 | Plüss et al. |
| 2018/0103229 | A1* | 4/2018 | Yang .................. H04N 5/4403 |

FOREIGN PATENT DOCUMENTS

| | | |
|---|---|---|
| KR | 10-2008-0010859 | 1/2008 |
| KR | 10-2013-0057373 | 5/2013 |
| KR | 10-2015-0050099 | 5/2015 |
| KR | 10-1589597 | 1/2016 |
| KR | 10-2016-0023742 | 3/2016 |
| KR | 10-1657314 | 9/2016 |

OTHER PUBLICATIONS

Extended Search Report dated Aug. 13, 2019 in counterpart European Patent Application No. 19180336.0.
Communication pursuant to Article 94(3) EPC dated Aug. 19, 2020 in counterpart European Patent Application No. 19180336.0.

* cited by examiner

REMOTE CONTROL APPARATUS, CONTROL METHOD THEREOF AND ELECTRONIC SYSTEM

CROSS-REFERENCE TO RELATED APPLICATION

This application is based on and claims priority under 35 U.S.C. § 119 to Korean Patent Application No. 10-2018-0076391, filed on Jul. 2, 2018, in the Korean Intellectual Property Office, the disclosure of which is incorporated by reference herein in its entirety.

BACKGROUND

1. Field

The disclosure relates to a remote control apparatus, a control method thereof, and an electronic system, and for example, to a remote control apparatus for turning on an electronic apparatus, a controlling method thereof, and an electronic system.

2. Description of Related Art

Bluetooth using the IEEE 802.15.1 standard is an industry standard of Personal Area Networks (PANs). Bluetooth uses ISM band, 2.45 GHz, and consumes relatively low power, with a low cost. Recently, Bluetooth has been applied to consumer electronic (CE) devices such as a TV, etc.

A conventional TV includes an Infrared Ray (IR) receiver as well as a Bluetooth (BT) function, and a BT remote controller not only performs a BT function but also includes an IR transmitter. Before a user purchases a TV, the TV and a BT remote controller are paired with each other through Bluetooth, the user may press a power button of the BT remote controller to turn on the TV. According to a power button operation, the BT remote controller may transmit an IR signal of Power On, and the TV may receive the IR signal from the IR receiver to be turned on.

Alternatively, the user may directly operate a power button (or, a function key) provided in the TV to turn on the TV.

When the TV is turned on, the TV and the BT remote controller may be paired through Bluetooth, and while the pairing is maintained, the user may control the TV with the BT remote controller without the above-described operation.

When the user loses the BT remote controller paired with the TV and sets up a new BT remote controller, the TV may be turned on through the operation, and the pairing between the TV and the BT remote controller may be performed. Therefore, before the TV and the BT remote controller are paired, the TV needs to be turned on often.

When turning on the TV using the IR signal, the TV includes an IR receiver, the BT remote controller includes the IR transmitter, which results in increasing costs. In addition, when the user directly turns on the TV, the user must move close to the TV. Therefore, it is inconvenient for the user.

Accordingly, there arises the need for reducing the costs of an apparatus by removing an IR transceiver, turning on the apparatus without causing a user inconvenience, and performing pairing between apparatuses.

SUMMARY

An example aspect of the disclosure relates to providing a remote control apparatus for turning on an electronic apparatus without an IR receiver in a state where a remote control apparatus without an IR transmitter is not paired with an electronic apparatus, a controlling method thereof, and an electronic system.

According to an example embodiment, a remote control apparatus is provided, the remote control apparatus, including an inputter comprising input circuitry, a communicator comprising communication circuitry, a microphone, and a processor configured to: control the communicator to transmit a first Bluetooth packet requesting an electronic apparatus to output a non-audible sound based on a control command being input through the inputter in a state where the remote control apparatus is not paired, obtain identification information of the electronic apparatus based on the non-audible sound based on the non-audible sound output by the electronic apparatus corresponding to the first Bluetooth packet being received through the microphone, and control the communicator to transmit a second Bluetooth packet including the obtained identification information and a turn-on command to the electronic apparatus.

The processor, based on a plurality of non-audible sounds being received through the microphone after the first Bluetooth packet is transmitted, may obtain the identification information of the electronic apparatus from one of the plurality of non-audible sounds based on at least one of a time point of receiving each of the plurality of non-audible sounds or a signal intensity of each of the plurality of non-audible sounds.

The processor, based on the control command being input through the inputter in a state where the remote control apparatus is paired with the electronic apparatus, may control the communicator to transmit a third Bluetooth packet including the control command.

The processor may receive the non-audible sound by activating the microphone during a predetermined time period from a time point of transmitting the first Bluetooth packet.

The second Bluetooth packet may include the obtained identification information and the turn-on command based on the control command being the turn-on command, wherein the second Bluetooth packet includes the obtained identification information, the turn-on command, and the control command based on the control command not being the turn-on command.

The first Bluetooth packet may be an undirected Bluetooth packet, and the second Bluetooth packet may be a directed Bluetooth packet.

According to an example embodiment, an electronic system is provided, the system including, a remote control apparatus configured to transmit a first Bluetooth packet requesting output of a non-audible sound based on a control command being input in a non-paired state, and an electronic apparatus configured to, based on a first Bluetooth packet requesting the output of the non-audible sound being received, output a non-audible sound including identification information of the electronic apparatus based on the first Bluetooth packet, wherein the remote control apparatus is further configured to, based on the non-audible sound output by the electronic apparatus corresponding to the first Bluetooth packet being received, obtain the identification information of the electronic apparatus based on the non-audible sound, and to transmit a second Bluetooth packet including the obtained identification information and a turn-on command to the electronic apparatus, and wherein the electronic apparatus is configured to turn on the electronic apparatus based on a second Bluetooth packet including the identification information being received.

The remote control apparatus, based on the control command being input in a state where the remote control apparatus is paired with the electronic apparatus, may transmit a third Bluetooth packet including the control command to the electronic apparatus.

The remote control apparatus may receive the non-audible sound by activating a microphone of the remote control apparatus during a predetermined time period from a time point of transmitting the first Bluetooth packet.

The second Bluetooth packet may include the obtained identification information and the turn-on command based on the control command being the turn-on command, wherein the second Bluetooth packet includes the obtained identification information, the turn-on command, and the control command based on the control command not being the turn-on command.

The first Bluetooth packet may be an undirected Bluetooth packet, wherein the second Bluetooth packet may be a directed Bluetooth packet.

The electronic apparatus may be further configured to, based on the second Bluetooth packet being received in a turn-off state, turn on the electronic apparatus and perform pairing with a remote control apparatus which transmits the second Bluetooth packet, and based on the second Bluetooth packet being received in a turn-on state, perform pairing with the remote control apparatus.

According to an example embodiment, a remote control apparatus for controlling an electronic apparatus is provided, the remote control apparatus including, an inputter comprising input circuitry, a communicator comprising communication circuitry, a microphone, and a processor configured to, based on a control command being input through the inputter, control the communicator to transmit a first Bluetooth packet requesting the electronic apparatus to output a non-audible sound, based on the non-audible sound output by the electronic apparatus corresponding to the first Bluetooth packet being received through the microphone, to obtain identification information of the electronic apparatus based on the non-audible sound, and to control the communicator to transmit a second Bluetooth packet including the obtained identification information and a turn-on command to the electronic apparatus.

According to an embodiment, a method of controlling a remote control apparatus that controls an electronic apparatus is provided, the method including receiving a control command in a state where the remote control apparatus is not paired, transmitting a first Bluetooth packet requesting the electronic apparatus to output a non-audible sound, receiving the non-audible sound output by the electronic apparatus corresponding to the first Bluetooth packet, obtaining identification information of the electronic apparatus based on the non-audible sound, and transmitting a second Bluetooth packet including the obtained identification information and a turn-on command.

The receiving may include receiving a plurality of non-audible sounds after transmitting the first Bluetooth packet, wherein the obtaining comprises obtaining the identification information of the electronic apparatus from one of the plurality of non-audible sounds based on at least one of a time point of receiving each of the plurality of non-audible sounds or a signal intensity of each of the plurality of non-audible sounds.

The method may further include, based on the control command being input in a state where the remote control apparatus is paired with the electronic apparatus, transmitting a third Bluetooth packet including the control command to the electronic apparatus.

The receiving may include receiving the non-audible sound by activating the microphone of the remote control apparatus during a predetermined time period from a time point of transmitting the first Bluetooth packet.

The receiving may include receiving the non-audible sound by activating the microphone of the remote control apparatus during a predetermined time period from a time point of transmitting the first Bluetooth packet.

The first Bluetooth packet may be an undirected Bluetooth packet, wherein the second Bluetooth packet is a directed Bluetooth packet.

According to the above-described various example embodiments, a remote control apparatus controls an electronic apparatus to output a non-audible sound using a Bluetooth packet without being paired with a display device, and turn on the electronic apparatus using a Bluetooth packet including identification information of the electronic apparatus included in a non-audible sound upon receiving the non-audible sound, thereby reducing the manufacturing costs.

BRIEF DESCRIPTION OF THE DRAWINGS

The above and other aspects, features and attendant advantages of certain example embodiments will be more apparent from the following detailed description, taken in conjunction with the accompanying drawings, in which.

DETAILED DESCRIPTION

Figure 1:
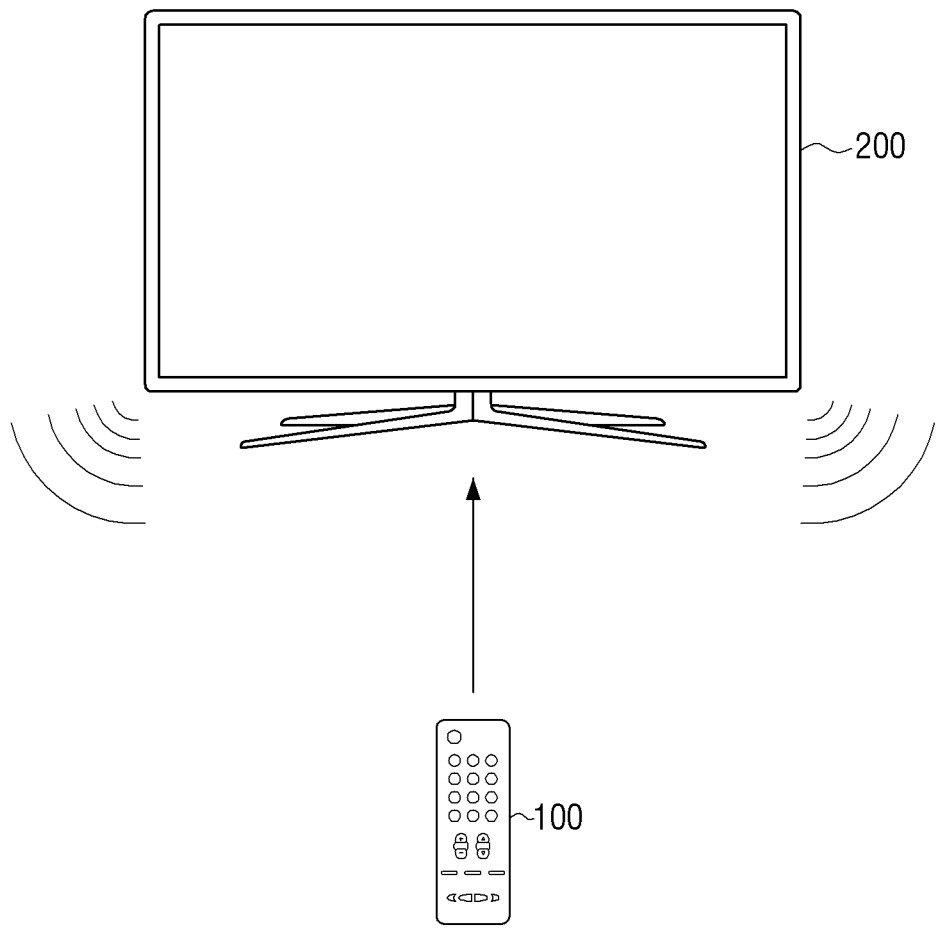
FIG. 1 is a diagram illustrating an example electronic system according to an embodiment.

Various example embodiments of the present disclosure may be diversely modified. Accordingly, various example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail where they would obscure the disclosure with unnecessary detail.

Hereinafter, various example embodiments of the disclosure will be described in greater detail with reference to the accompanying drawings.

FIG. 1 is a diagram illustrating an electronic system 1000 according to an embodiment. The electronic system 1000 may include a remote control apparatus 100 and an electronic apparatus 200.

The remote control apparatus 100 may perform communication with the electronic apparatus 200 and control the electronic apparatus 200. For example, the remote control apparatus 100 may be a remote controller for controlling the electronic apparatus 200. However, the disclosure is not limited thereto. Any type of apparatus could be used as long as the remote control apparatus 100 can control the electronic apparatus 200. For example, the remote control apparatus 100 may be a smart phone in which an application for controlling the electronic apparatus 200 is installed.

The remote control apparatus 100 may perform communication with not only the electronic apparatus 200, but also an apparatus other than the electronic apparatus 200.

For example, when the remote control apparatus 100 performs communication with the electronic apparatus 200, not only the electronic apparatus 200, but also the apparatuses near the remote control apparatus 100 may receive a signal transmitted from the remote control apparatus 100. However, the electronic apparatus 200 may perform the operation corresponding to the received signal. When the remote control apparatus 100 performs communication with an apparatus other than the electronic apparatus 200, the apparatuses near the remote control apparatus 100 as well as the electronic apparatus 200 may receive signals transmitted from the remote control apparatus 100, and the apparatuses that receive the signals may perform the operations corresponding to the signals transmitted from the remote control apparatus 100.

The remote control apparatus 100 may perform pairing with the electronic apparatus 200 according to a Bluetooth standard. In addition, the remote control apparatus 100 may be a device without an IR transceiver. However, the disclosure is not limited thereto, and the remote control apparatus 100 may perform communication with the electronic apparatus 200 according to another communication standard other than the Bluetooth standard. Any type of apparatus may be used for the remote control apparatus 100 as long as it can communicate with the electronic apparatus 200 without using an IR transceiver. The IR transceiver may, for example, be a configuration for Infrared Ray communication.

The remote control apparatus 100 may transmit a Bluetooth packet requesting an electronic apparatus to output non-audible sound, and may receive non-audible sound output from the electronic apparatus 200. The non-audible sound may, for example, be a sound wave in a high frequency band that cannot be easily perceived by a human being.

When using the non-audible sound, the sensitivity of the signal may be controlled according to the intensity of the sound, and thus the location may be identified without a particular wireless communication means. The non-audible sound may be used for near field data communication without causing inconvenience to a user. In addition, since the electronic apparatus 200 may generally include a speaker, a separate IR transceiver may not be necessary in a case of using the non-audible sound.

The remote control apparatus 100 may identify the electronic apparatus 100 based on the received non-audible sound, and transmit a Bluetooth packet including a turn-on command to the identified electronic apparatus 200.

The electronic apparatus 200 may perform communication with the remote control apparatus 100, and perform a command transmitted by the remote control apparatus 100. For example, the electronic apparatus 200 may be an apparatus with a display such as a TV, a computer, a monitor, etc. However, the disclosure is not limited thereto. Any type of apparatus may be used as long as it is controlled wirelessly by the remote control apparatus 100. FIG. 1 illustrates that the electronic apparatus 200 is a display device, but is not limited thereto. For example, the electronic apparatus 200 may be an apparatus without a display such as a speaker, a refrigerator, etc.

The electronic apparatus 200 may be in an off state. However, the electronic apparatus 200 may be supplied with power and perform the operation at the minimum and/or reduced level. For example, the electronic apparatus 200 may receive the Bluetooth packet transmitted from the remote control apparatus 100.

The electronic apparatus 200 may output non-audible sound based on the received Bluetooth packet or turn on the electronic apparatus 200.

As described above, the operation has been described when the remote control apparatus 100 and the electronic apparatus 200 are not paired with each other. When the electronic apparatus 200 is turned on, the remote control apparatus 100 and the electronic apparatus 200 may perform an operation to be paired with each other.

Pairing may be a process of registering identification information of the remote control apparatus 100 and the electronic apparatus 200 to be operable in connection with each other.

The operations of the remote control apparatus 100 and the electronic apparatus 200 included in the electronic system 1000 have been briefly described. Hereinafter, a method of turning on the electronic apparatus 200 by the remote control apparatus 100 will be described in greater detail.

Figure 2A:
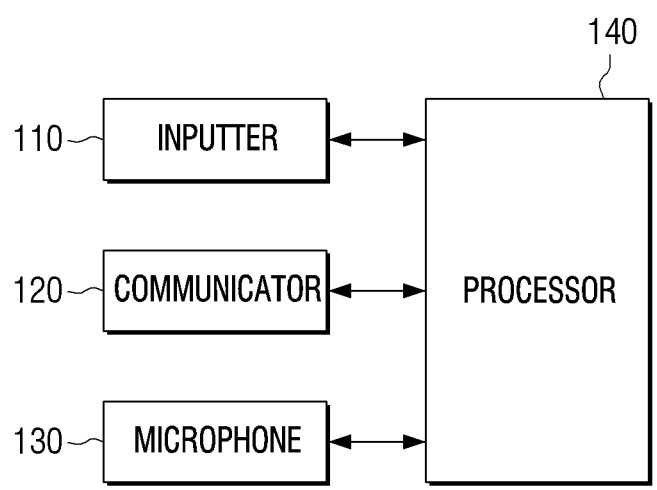
FIG. 2A is a block diagram illustrating an example configuration of a remote control apparatus according to an embodiment.

FIG. 2A is a block diagram illustrating an example configuration of a remote control apparatus according to an embodiment.

Referring to FIG. 2A, a remote control apparatus 100 may include an inputter (e.g., including input circuitry) 110, a communicator (e.g., including communication circuitry) 120, a microphone 130, and a processor (e.g., including processing circuitry) 140.

The inputter 110 may include various types of input circuitry, such as, for example, and without limitation, a mechanical button, a touch pad, a whirl, etc. provided in an area such as, for example, and without limitation, a front part, a side par, a rear part, etc. of the outside of the body.

The communicator 120 may include various communication circuitry and perform communication with the electronic apparatus 200. For example, the communicator 120 may include various circuitry to support communication method such as, for example, and without limitation, Bluetooth (BT), Bluetooth Low Energy (BLE), etc., but may not support infrared ray communication. However, the disclosure is not limited thereto. The communicator 120 may include circuitry to support various communication methods such as, for example, and without limitation, Wireless Fidelity (WI-FI), Zigbee, etc. Any type of communication standard may be used if it does not support infrared communication, but supports communication with the electronic apparatus 200.

The microphone 130 may receive sound waves, and provide the received sound waves to the processor 140. For example, the microphone 130 may convert the recorded analog sound signals into digital signals using, for example, and without limitation, a Pulse Code Modulation (PCM) method, and provide the digital signals to the processor 140. The microphone 130 may provide the recorded analog sounds signal to the processor 140 without a separate signal processing.

The microphone 130 may receive the sound wave corresponding to the non-audible sound. For example, the microphone 130 may receive a sound wave in a bandwidth that can perceived by a human being, as well as a sound wave in a bandwidth that cannot be perceived by a human being.

The microphone 130 may include a plurality of microphones. In this case, the processor 140 may obtain at least one of the location and the direction of the electronic apparatus 200 that outputs the non-audible sound through the plurality of microphones.

The processor 140 may include various processing circuitry and control the operation of the remote control apparatus 100 overall by controlling the configuration provided in the remote control apparatus 100.

According to an embodiment, the processor 140 may include various processing circuitry, such as, for example, and without limitation, a digital signal processor (DSP), a microprocessor, a time controller (TCON), or the like, but is not limited thereto. However, the disclosure is not limited thereto. The processor 140 may include various processing circuitry, such as, for example, and without limitation, one or more central processing unit (CPU), a microcontroller unit (MCU), a micro processing unit (MPU), a controller, an application processor (AP), a communication processor (CP), an ARM processor, and the like. The processor 140 may be implemented as a system on chip (SoC), a large scale integration (LSI) with a built-in processing algorithm, and/or in the form of a field programmable gate array (FPGA).

When a control command is input through the inputter 110 in a state where the remote control apparatus 100 is not paired, the processor 140 may transmit a first Bluetooth packet requesting the output of the non-audible sound to the electronic apparatus 200 by controlling the communicator 120.

For example, when a button for turning on a power is operated in a state where the remote control apparatus 100 is not paired, the processor 140 may transmit the first Bluetooth packet requesting the output of the non-audible sound to the electronic apparatus 200 by controlling the communicator 120. The button for turning on a power may not be a button for controlling the remote control apparatus 100, but a button for controlling an apparatus near the remote control apparatus 100.

However, not only the electronic apparatus 200 may receive the first Bluetooth packet transmitted from the remote control 100. The first Bluetooth packet may be an undirected Bluetooth packet, and the apparatus that receives a Bluetooth packet, among the apparatuses near the remote control apparatus 100, may receive the first Bluetooth packet, and output the non-audible sound based on the first Bluetooth packet.

For example, when there is only the electronic apparatus 200 near the remote control apparatus 100, the electronic apparatus 200 may receive the first Bluetooth packet, and then output non-audible sound based on the first Bluetooth packet. When there exist a first display device and a second display device near the remote control apparatus 100, each of the first and second display devices may receive the first Bluetooth packet, and output the non-audible sound based on the first Bluetooth packet.

The processor 140, when the non-audible sound output from the electronic apparatus 200 corresponding to the first Bluetooth packet is received through the microphone 130, may obtain identification information of the electronic apparatus based on the non-audible sound.

The electronic apparatus 200 may generate non-audible sound to include the identification information of the electronic apparatus 200. For example, the electronic apparatus 100 may convert the identification information of the electronic apparatus, which may be a digital signal, into an analog signal through a digital-analog conversion circuit, modulate the analog signal through a carrier signal in a frequency band of the non-audible sound, generate non-audible sound, and then output the generated non-audible sound through a speaker.

The processor 140 may obtain an analog signal by demodulating the received non-audible sound, and convert the analog signal into a digital signal through an analog-digital conversion circuit to obtain the identification information of the electronic apparatus 200.

The digital-analog conversion operation of the electronic apparatus 200 and the analog-digital conversion operation of the processor 140 may correspond to each other. In addition, the modulation operation of the electronic apparatus 200 and the demodulation operation of the processor 140 may correspond to each other. The processor 140 may obtain the identification information of the electronic apparatus 200.

However, the disclosure is not limited thereto. So long as the method in which the electronic apparatus 200 includes the identification information thereof in the non-audible sound corresponds to the method in which the processor 140 restores the identification information of the electronic apparatus 200 from the non-audible sound, any type of method could be used.

The processor 140 may transmit a second Bluetooth packet including the obtained identification information and the turn-on command to the electronic apparatus 200 by controlling the communicator 130.

The second Bluetooth packet may be a directed Bluetooth packet. In other words, the device that receives the Bluetooth packet among the apparatuses near the remote control apparatus 100, may receive the second Bluetooth packet, but not all the peripheral apparatuses may perform the operation corresponding to the second Bluetooth packet.

For example, when there exist electronic apparatus 200 and a display device near the remote control apparatus 200, and the second Bluetooth packet includes the identification information of the electronic apparatus 200, each of the electronic apparatus 200 and the display device may receive the second Bluetooth packet, but only the electronic apparatus 200 may be turned on based on the second Bluetooth packet.

The processor 140 may control the communicator 120 to transmit the second Bluetooth packet including only the obtained identification information to the electronic apparatus 200. In this case, the electronic apparatus 200 may obtain the identification information included in the second Bluetooth packet, and may turn on the electronic apparatus 200 when the obtained identification information is the same as the identification information of the electronic apparatus 200.

When a plurality of non-audible sounds are received through the microphone 130 after the first Bluetooth packet is transmitted, the processor 140 may obtain the identification information of the electronic apparatus from at least one of the plurality of non-audible sounds based on at least one of the receiving time point of each of the plurality of non-audible sounds and the signal intensity.

For example, when a first non-audible sound output from the electronic apparatus 200 and a second non-audible sound output from the display device are received through the microphone 130 after the first Bluetooth packet is transmitted, the processor 140 may obtain identification information the first received one between the first and second non-audible sounds.

However, the disclosure is not limited thereto. The processor 140 may estimate the directions of the plurality of non-audible sounds, and obtain the identification information from the non-audible sound output from the device in front of the remote control apparatus 100.

The processor 140 may receive the non-audible sound by activating the microphone 130 during a predetermined time period from the point of time of transmitting the first Bluetooth packet. For example, the processor 140 may receive the non-audible sound by activating the microphone 130 for 1 (one) second from the time point of transmitting the first Bluetooth packet, and inactivate the microphone 130 after 1 (one) second from the time point of transmitting the first Bluetooth packet.

However, the disclosure is not limited thereto. The processor 140 may maintain the microphone 130 to be activated, and obtain the identification information from the non-audible sound input through the microphone 130 during a predetermined time period from the time point of transmitting the first Bluetooth packet. In this case, the processor 140 may ignore the non-audible sound input through the microphone 130 after a predetermined time period after the time point of transmitting the first Bluetooth packet.

When a control command is a turn-on command, the second Bluetooth packet may include the obtained identification information and a turn-on command, and when the control command is not a turn-on command, the second Bluetooth packet may include the obtained identification information, a turn-on command and a control command.

When not being paired, the processor 140 may transmit the second Bluetooth packet including a turn-on command to the electronic apparatus 200 regardless of the type of a control command and turn on the electronic apparatus 200.

The operation of the remote control apparatus 100 has been described in a state where the remote control apparatus 100 and the electronic apparatus 200 are not paired with each other, but a control command may be input in a state where the remote control apparatus 100 and the electronic apparatus 200 are paired with each other.

When a control command is input through the inputter 110 in a state where the remote control apparatus 100 is paired with the electronic apparatus 200, the processor 140 may control the communicator 120 and transmit the third Bluetooth packet including a control command to the electronic apparatus 200. In other words, when a control command is input through the inputter 110 in a state where the remote control apparatus 100 is paired with the electronic apparatus 200, the processor 140 may not transmit the first Bluetooth packet requesting the output of the non-audible sound. In addition, when the remote control apparatus 100 is paired with the electronic apparatus 200, the third Bluetooth packet may be a directed Bluetooth packet. In other words, the remote control apparatus 100 may pre-store identification information such as MAC address, etc. of the electronic apparatus 200, and transmit a directed Bluetooth packet to the electronic apparatus 200 based on the stored identification information.

Figure 2B:
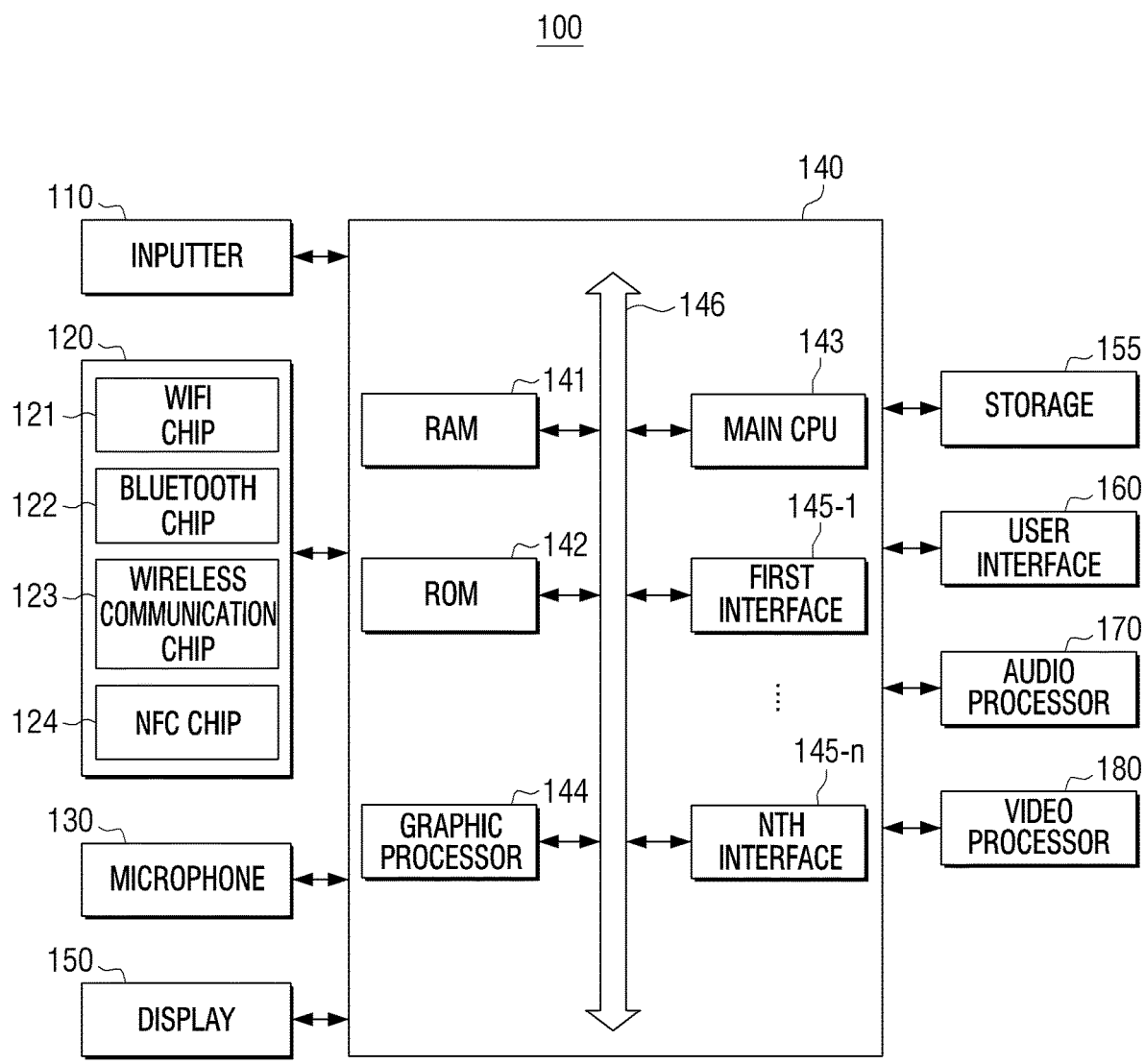
FIG. 2B is a block diagram illustrating an example configuration of a remote control apparatus according to an embodiment.

FIG. 2 is a block diagram illustrating an example configuration of a remote control apparatus 100. Referring to FIG. 2B, the remote control apparatus 100 may include an inputter (e.g., including input circuitry) 110, a communicator (e.g., including communication circuitry) 120, a microphone 130, a processor (e.g., including processing circuitry) 140, a display 150, a storage 155, a user interface (e.g., including user interface circuitry) 160, an audio processor (e.g., including audio processing circuitry) 170, and a video processor (e.g., including video processing circuitry) 180. The redundant description of the elements of FIG. 2B, which have been described in FIG. 2A may not be repeated here.

The processor 140 may include various processing circuitry and use various programs stored in the storage 155 and control the operations of the remote control apparatus 100 overall.

For example, the processor 140 may include a RAM 141, a ROM 142, a main CPU 143, a graphics processor 144, first to n interfaces 145-1 to 145-n, and a bus 146.

The RAM 141, the ROM 142, the main CPU 143, the graphics processor 144, the first to n interfaces 145-1 to 145-n and the like may be connected to one another via the bus 146.

The first to nth interfaces 145-1 to 145-n may be connected to the above-described various constituent elements. One of the interfaces may be a network interface connected to an external device through a network.

The main CPU 143 may access the storage 155, and perform booting using the O/S stored in the storage 155. The main CPU 143 may perform various operations using various programs, etc. stored in the storage 155.

A command set, etc. for system booting may be stored in the ROM 142. When a turn-on command is input and power is supplied, the CPU 143 may copy the O/S stored in the storage 155 to the RAM 141 according to the command stored in the ROM 142, execute the O/S and perform system booting. When the booting is completed, the CPU 143 may copy various application programs stored in the storage 155 to the RAM 141, execute the application programs copied to the RAM 141, and perform various operations.

The graphic processor 144 may generate a screen including various objects such as icons, images, texts, etc. by using a calculation unit (not shown) and a rendering unit (not shown). The calculation unit (not shown) may calculate attribute values such as coordinate values, shapes, sizes, colors, etc. of the objects according to the layout of the screen by using the received control command. The rendering unit (not shown) may generate screens of various layouts including objects based on the attribute values calculated by the calculation unit (not shown). The screen generated by the rendering unit (not shown) may be displayed in a display region of the display 150.

The display 150 may be implemented as various types of displays such as, for example, and without limitation, an LCD (Liquid Crystal Display), an OLED (Organic Light Emitting Diodes) display, a PDP (Plasma Display Panel), and the like. The display 150 may also include a driving circuit, a backlight unit, etc., which may be implemented in the form of, for example, and without limitation, an a-si TFT, a low temperature poly silicon (LTPS) TFT, an organic TFT (OTFT), etc. Meanwhile, the display 150 may be implemented as a touch screen in combination with a touch sensor.

The operation of the processor 140 may be performed by the program stored in the storage 155.

The storage 155 may store various data such as, for example, and without limitation, an Operating System (O/S) software module for driving the remote control apparatus 100, an operation module for forming a communication channel, various communication modules, information on the paired electronic apparatus 200, etc.

The communicator 120 may include various communication circuitry and perform communication with various types of external devices according to various types of communication methods. The communicator 120 may include various communication circuitry implemented in various communication chips, such as, for example, and without limitation, a WiFi chip 121, a Bluetooth chip 122, a wireless communication chip 123, an NFC chip 124, etc. The processor 140 may perform communication with various types of external devices using the communicator 120.

The Wi-Fi chip 121 and the Bluetooth chip 122 may perform communication using a Wi-Fi method, and a Bluetooth method, respectively. When the Wi-Fi chip 121 or the Bluetooth chip 122 is used, various connectivity information such as an SSID and a session key may be transmitted and received first, communication connection may be established based on the connectivity information, and various information may be transmitted and received based thereon. The wireless communication chip 123 refers to a chip that performs communication according to various communication standards such as IEEE, ZigBee, 3rd Generation (3G), 3rd Generation Partnership Project (3GPP), Long Term Evolution (LTE), etc. The NFC chip 124 refers to a chip operating in an NFC (Near Field Communication) mode using 13.56 MHz band among various RF-ID frequency bands such as 135 kHz, 13.56 MHz, 433 MHz, 860 to 960 MHz and 2.45 GHz.

The communicator 120 may perform one-way communication or two-way communication with an external device. When one-way communication is performed, the communicator 120 may receive a signal from an external device. When two-way communication is performed, the communicator 120 may receive a signal from an external device, or transmit a signal to an external device.

The user interface 160 may include various user interface circuitry and receive various user interactions. The user interface 160 may be embodied in various forms according to an example embodiment of the remote control apparatus 100. For example, the user interface 160 may include various user interface circuitry, such as, for example, and without limitation, buttons provided in the remote control apparatus 100, a microphone that receives a user voice, a camera for sensing a user motion, etc. When the remote control apparatus 100 is embodied as a touch-based electronic apparatus, the user interface 160 may, for example, and without limitation, be embodied as a touch screen that forms a mutual layer structure with a touch pad. In this case, the user interface 160 may be used as the display 150.

The audio processor 170 may be an element for performing processing of audio data. The audio processor 170 may include various audio processing circuitry and perform various processing such as decoding, amplification, noise filtering, etc. with respect to audio data.

The video processor 180 may perform processing of video data. The video processor 180 may include various video processing circuitry and perform various image processing such as decoding, scaling, noise filtering, frame rate conversion, resolution conversion, etc. of video data.

The remote control apparatus 100 may turn on the electronic apparatus 200 without an IR transceiver by using a Bluetooth packet and non-audible sound.

Figure 3:
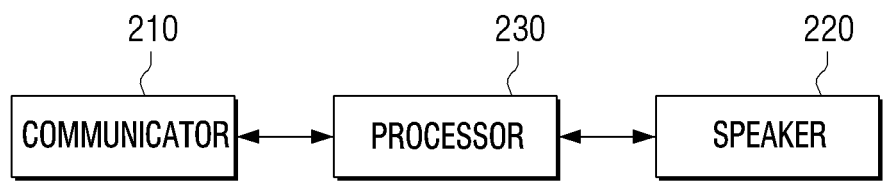
FIG. 3 is a block diagram illustrating an example configuration of an electronic apparatus according to an embodiment.

FIG. 3 is a block diagram illustrating an example configuration of an electronic apparatus according to an embodiment.

Referring to FIG. 3, an electronic apparatus 200 may include a communicator (e.g., including communication circuitry) 210, a speaker 220, and a processor (e.g., including processing circuitry) 230.

The communicator 210 may include various communication circuitry and perform communication with the remote control apparatus 100. For example, the communicator 210 may include various communication circuitry and support the communication method such as, for example, and without limitation, Bluetooth (BT), Bluetooth Low Energy (BLE), etc. or may not support infrared communication. However, the disclosure is not limited thereto. The communicator 210 could be any type if it supports various communication methods such as Wireless Fidelity (WI-FI), Zigbee, etc., but not infrared communication, and performs communication with the remote control apparatus 100.

The speaker 220 may be configured to output various alarming sounds or voice messages, etc. as well as various audio data. The speaker 220 may be electrically connected to the processor 230, and may output non-audible sound by the control of the processor 230.

The processor 230 may include various processing circuitry and control the operations of the electronic apparatus 200 overall by controlling the configurations provided in the electronic apparatus 200.

According to an example embodiment, the processor 230 may include various processing circuitry, such as, for example, and without limitation, a digital signal processor (DSP), a microprocessor, a time controller (TCON), or the like, but is not limited thereto, and may, for example, and without limitation, include one or more of a central processing unit (CPU), a micro controller unit (MCU), a micro processing unit (MPU), a controller, an application processor (AP), or a communication processor (CP), an ARM processor, and the like. The processor 230 may be implemented as a system on chip (SoC), a large scale integration (LSI) with a built-in processing algorithm, or a Field Programmable Gate Array (FPGA).

The processor 230 may receive the first Bluetooth packet from the remote control apparatus 100 through the communicator 210 in a state where the electronic apparatus 200 is turned off. The state where the electronic apparatus 200 is turned off may refer, for example to operating at a minimum and/or reduced level to such an extent as to receive a Bluetooth packet.

For example, when the electronic apparatus 200 is turned off, only the communicator 210 may be activated. When the first Bluetooth packet is received from the remote control apparatus 100 through the communicator 210, the processor 230 of the electronic apparatus 200 may be activated. The electronic apparatus 200 may include a main processor and a sub-processor, and when the electronic apparatus 200 is turned off, only the communicator 210 and the sub-processor may be activated. When the first Bluetooth packet is received from the remote control apparatus 100 through the communicator 210, the sub-processor of the electronic apparatus 200 may determine whether the main processor is activated based on the first Bluetooth packet.

When the first Bluetooth packet requesting the output of the non-audible sound is received, the processor 230 may output the non-audible sound including the identification information of the electronic apparatus 200 through the speaker 220 based on the first Bluetooth packet.

For example, when the first Bluetooth packet requesting the output of the non-audible sound is received, the processor 230 may convert the identification information of the electronic apparatus 200, which is a digital signal, to an analog signal through a digital-analog conversion circuit based on the first Bluetooth packet, and modulate the analog signal through a carrier signal in a frequency band of the non-audible sound to generate a non-audible sound, and output the non-audible sound through the speaker 220.

When the second Bluetooth packet including the identification information of the electronic apparatus 200 and a turn-on command is received, the processor 230 may turn on the electronic apparatus 200. For example, when the second Bluetooth packet is received, the processor 230 may obtain the identification information and the turn-on command included in the second Bluetooth packet, and when the obtained identification information is the identification information of the electronic apparatus 200, the processor 230 may turn on the electronic apparatus 200 based on the obtained turn-on command.

In addition, when the second Bluetooth packet including only the identification information of the electronic apparatus 200 is received, the processor 230 may obtain the identification information included in the second Bluetooth packet, and when the obtained identification information is the identification information of the electronic apparatus 200, the processor 230 may turn on the electronic apparatus 200 automatically.

The processor 230 may identify only the second Bluetooth packet received during a predetermined time period from the time point of outputting a non-audible sound. For example, when the second Bluetooth packet is received for 1 (one) second from the time point of outputting a non-audible sound, the processor 230 may turn on the electronic apparatus 200 based on the second Bluetooth packet. The processor 230, when the second Bluetooth packet is received after 1 (one) second from the time point of outputting a non-audible sound, may not perform the operation corresponding to the second Bluetooth packet.

When the second Bluetooth packet including the identification information of the electronic apparatus 200, the turn-on command, and the control command are received, the processor 230 may obtain identification information included in the second Bluetooth packet, and when the obtained identification information is the identification information of the electronic apparatus 200, the processor 230 may turn on the electronic apparatus 200 and perform the operation corresponding to the control command.

When the second Bluetooth packet is received in a state where the electronic apparatus 200 is turned off, the processor 230 may turn on the electronic apparatus 200 and perform pairing with the remote control apparatus 100 to which the second Bluetooth packet is transmitted. The processor 230, when the second Bluetooth packet is received in a state where the electronic apparatus 200 is turned on, may perform pairing with the remote control apparatus 100.

It has been described that when the Bluetooth packet is received in a state where the remote control apparatus 100 and the electronic apparatus 200 are not paired with each other, the processor 230 may output non-audible sound through the speaker 220 or turn on the electronic apparatus 200.

When the Bluetooth packet is received in a state where the remote control apparatus 100 and the electronic apparatus 200 are paired with each other, the processor 230 may perform the operation corresponding to the control command included in the Bluetooth packet.

As described above, the electronic apparatus 200 may receive a Bluetooth packet from the remote control apparatus 100 without an IR transceiver, and may be turned on based on the received Bluetooth packet.

Hereinafter, an example operation of the disclosure will be described in greater detail based on the drawings.

Figure 4:
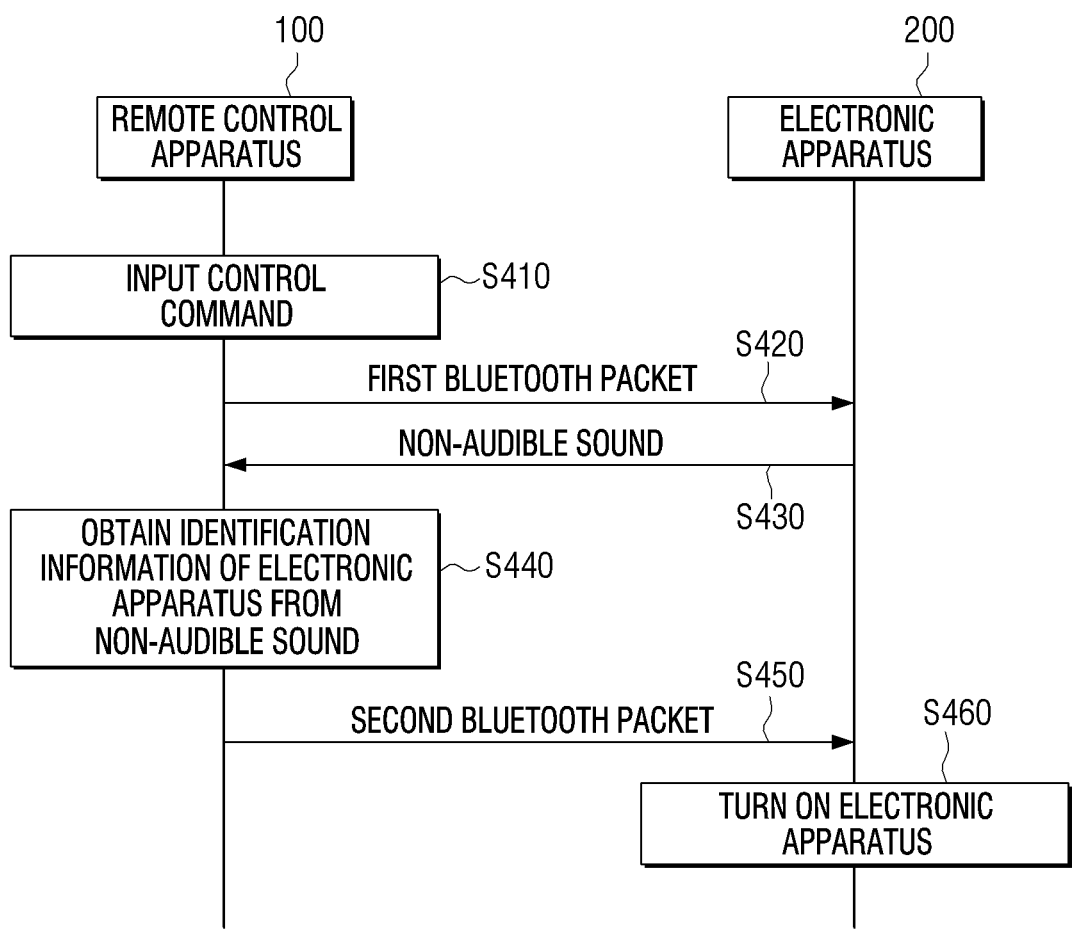
FIG. 4 is a sequence diagram illustrating an example operation of an electronic system according to an embodiment.

FIG. 4 is a sequence diagram illustrating an example operation of an electronic system 1000 according to an embodiment. The electronic system 1000 may include a remote control apparatus 100 and an electronic apparatus 200, and the remote control apparatus 100 and the electronic apparatus 200 may not be paired.

The remote control apparatus 100 may receive a control command input at step S410. The control command may be a command for turning on the electronic apparatus 200. However, the disclosure is not limited thereto, the control command may be a command for controlling other functions.

When a control command is input, the remote control apparatus 100 may transmit the first Bluetooth packet requesting the output of non-audible sound to the electronic apparatus at step S420. The remote control apparatus 100, when a control command is input, may determine whether the remote control apparatus 100 is paired. The remote control apparatus 100 may transmit the first Bluetooth path packet to the electronic apparatus 200 when the remote control apparatus 100 is not paired.

However, the remote control apparatus 100 may not transmit the first Bluetooth packet to the electronic apparatus 200 when the remote control apparatus 100 is paired, and may transmit the third Bluetooth packet including a control command to the electronic apparatus 200.

For example, when the remote control apparatus 100 is paired with the electronic apparatus 200, the remote control apparatus 100 may store identification information such as MAC address of the electronic apparatus 200. The remote control apparatus 100 may transmit the third Bluetooth packet including the control command and the stored identification information of the electronic apparatus 200 to the electronic apparatus 200. In other words, the first Bluetooth packet is an undirected Bluetooth packet, and the third Bluetooth packet is a directed Bluetooth packet.

When the first Bluetooth packet is received, the electronic apparatus 200 may output a non-audible sound based on the first Bluetooth at step S430. The non-audible sound may include the identification information of the electronic apparatus 200.

When the non-audible sound is received, the remote control apparatus 100 may obtain the identification information of the electronic apparatus 200 from the non-audible sound at step S440. The remote control apparatus 100 may transmit the second Bluetooth packet including the identification information of the electronic apparatus 200 to the electronic apparatus 200 at step S450.

The remote control apparatus 100 may transmit the second Bluetooth packet including at least one of a turn-on command and a control command as well as the identification information of the electronic apparatus to the electronic apparatus 200. For example, when a channel-up button of the remote control apparatus 100 is operated, the remote control apparatus 100 may transmit the second Bluetooth packet including the identification information of the electronic apparatus, the turn-on command and the channel up command to the electronic apparatus 200.

When the second Bluetooth packet is received, the electronic apparatus 200 may turn on the electronic apparatus 200 at step S460.

Figure 5:
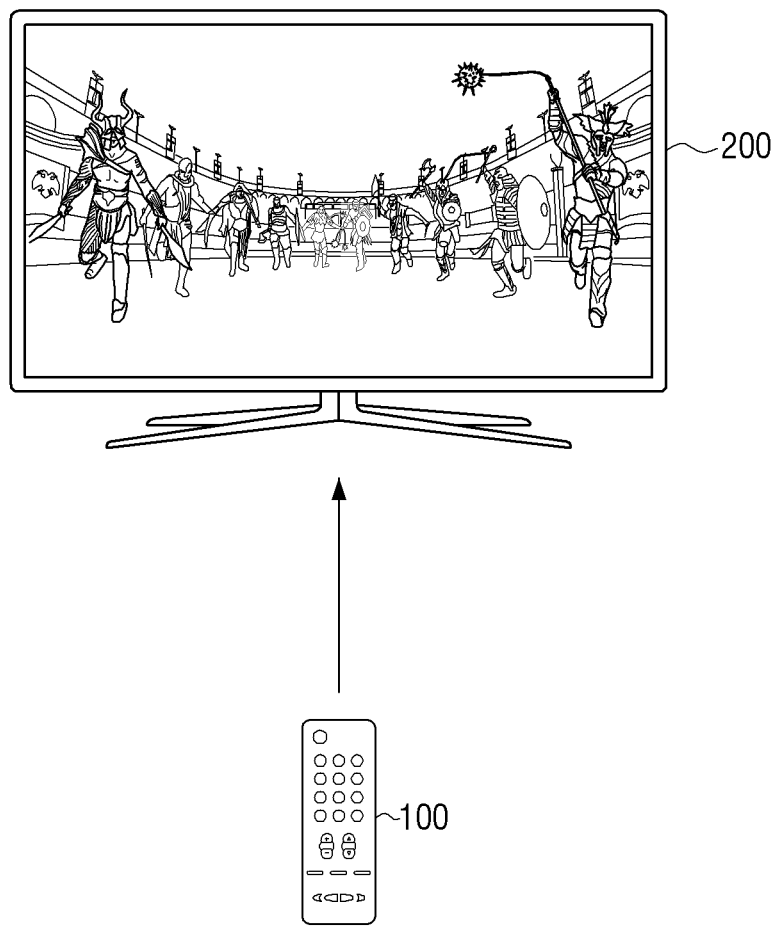
FIG. 5 is a diagram illustrating an example operation of an electronic apparatus in a turn-on state according to an embodiment.

FIG. 5 is a diagram illustrating an example operation of an electronic apparatus 200 in a turn-on state according to an embodiment.

When the electronic apparatus 200 is turned on, the electronic apparatus 200 may be retrieved by another apparatus for Bluetooth pairing.

Although not paired with the electronic apparatus 200, the remote control apparatus 100 may sense that the electronic apparatus 200 can be retrieved for Bluetooth connection.

When a control command is input, after being paired with the electronic apparatus 200, the remote control apparatus 100 may transmit a Bluetooth packet including a control command to the paired electronic apparatus 200.

The remote control apparatus 100 may sense that the plurality of electronic apparatuses can be retrieved for Bluetooth connection. In this case, the remote control apparatus 100, when a control command is input, may perform pairing with an electronic apparatus based on the intensities of the signals received from the plurality of electronic apparatuses, and transmit a Bluetooth packet including the control command to the paired electronic apparatus.

When a control command is input, the remote control apparatus 100 may transmit the first Bluetooth packet requesting the output of the non-audible sound, perform pairing with an electronic apparatus based on at least one of the time point of receiving of each of the received non-audible sounds, and the signal intensity, and transmit the Bluetooth packet including the control command to the paired electronic apparatus.

Figure 6:
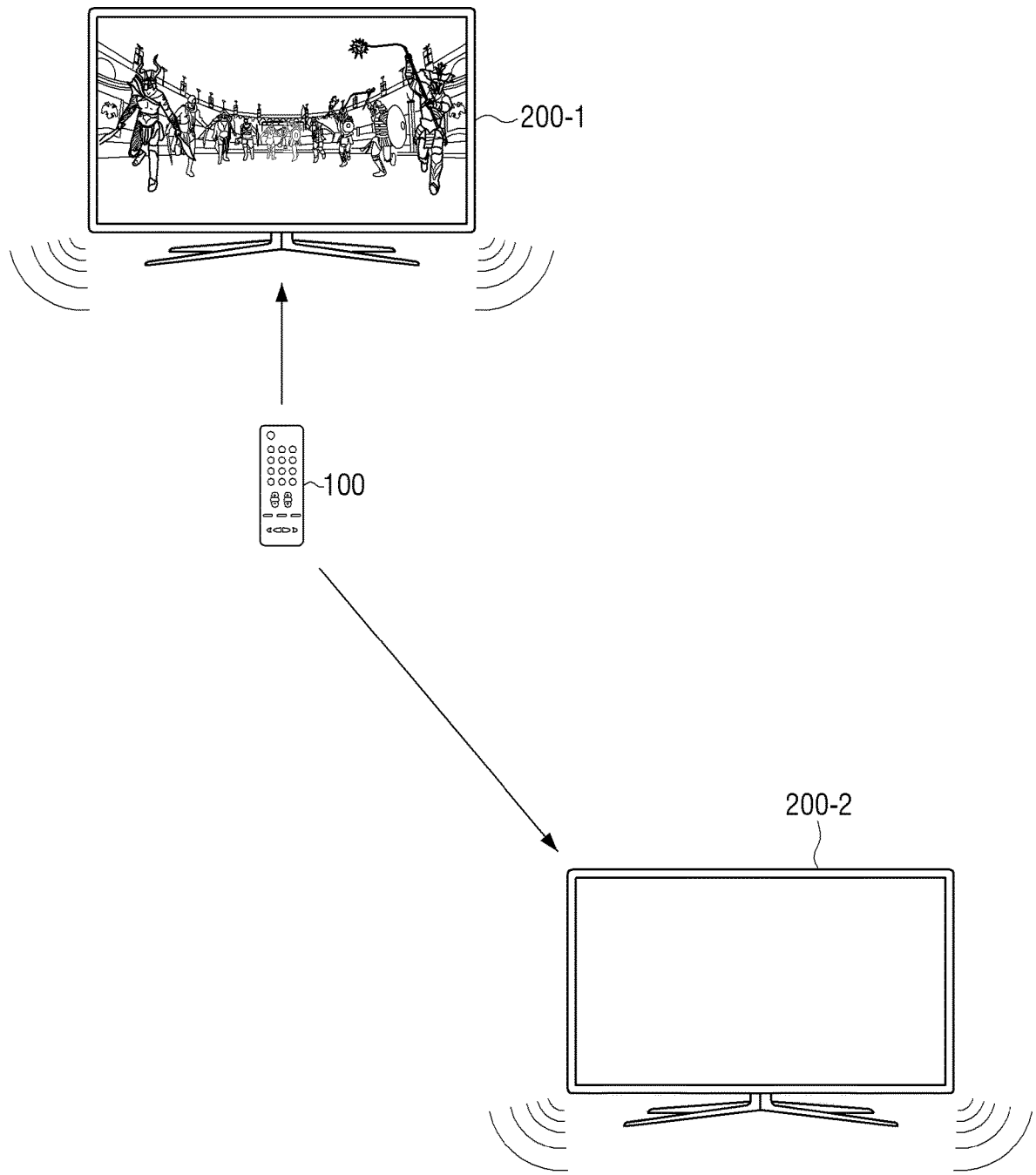
FIG. 6 is a diagram illustrating example operations of a plurality of electronic apparatuses according to an embodiment.

FIG. 6 is a diagram illustrating example operations of a plurality of electronic apparatuses 200-1, and 200-2 according to an embodiment.

When a control command is input without being paired with a plurality of electronic apparatuses 200-1 and 200-2, the remote control apparatus 100 my transmit the first Bluetooth packet requesting the output of the non-audible sound, the receive a plurality of non-audible sounds respectively output from the plurality of electronic apparatuses 200-1 and 200-2.

The remote control apparatus 100 may obtain identification information of one of the plurality of electronic apparatuses 200-1 and 200-2 from one of the plurality of non-audible sounds based on at least one of the time point of receiving each of the plurality of non-audible sounds and the signal intensity. The remote control apparatus 100 may transmit the second Bluetooth packet including the obtained identification information.

Each of the electronic apparatuses 200-1 and 200-2 may include a plurality of speakers, and the remote control apparatus 100 may estimate the directions of outputting non-audible sounds of the plurality of speakers of each of the electronic apparatuses 200-1 and 200-2 to estimate the locations of the electronic apparatuses 200-1 and 200-2. The remote control apparatus 100 may obtain identification information from the non-audible sound output from the electronic apparatus located in a predetermined direction.

The remote control apparatus 100 may include a plurality of microphones, and estimate the output direction of the non-audible sound through the plurality of microphones. In addition, the remote control apparatus 100 may obtain identification information from the non-audible sound output from the electronic apparatus located in a predetermined direction.

The remote control apparatus 100 may obtain identification information of each of the plurality of electronic apparatuses 200-1 and 200-2 from each of the plurality of non-audible sounds, and transmit the second Bluetooth packet including the identification information one of the plurality of electronic apparatuses based on the number of pairings with the remote control apparatus 100.

Figure 7:
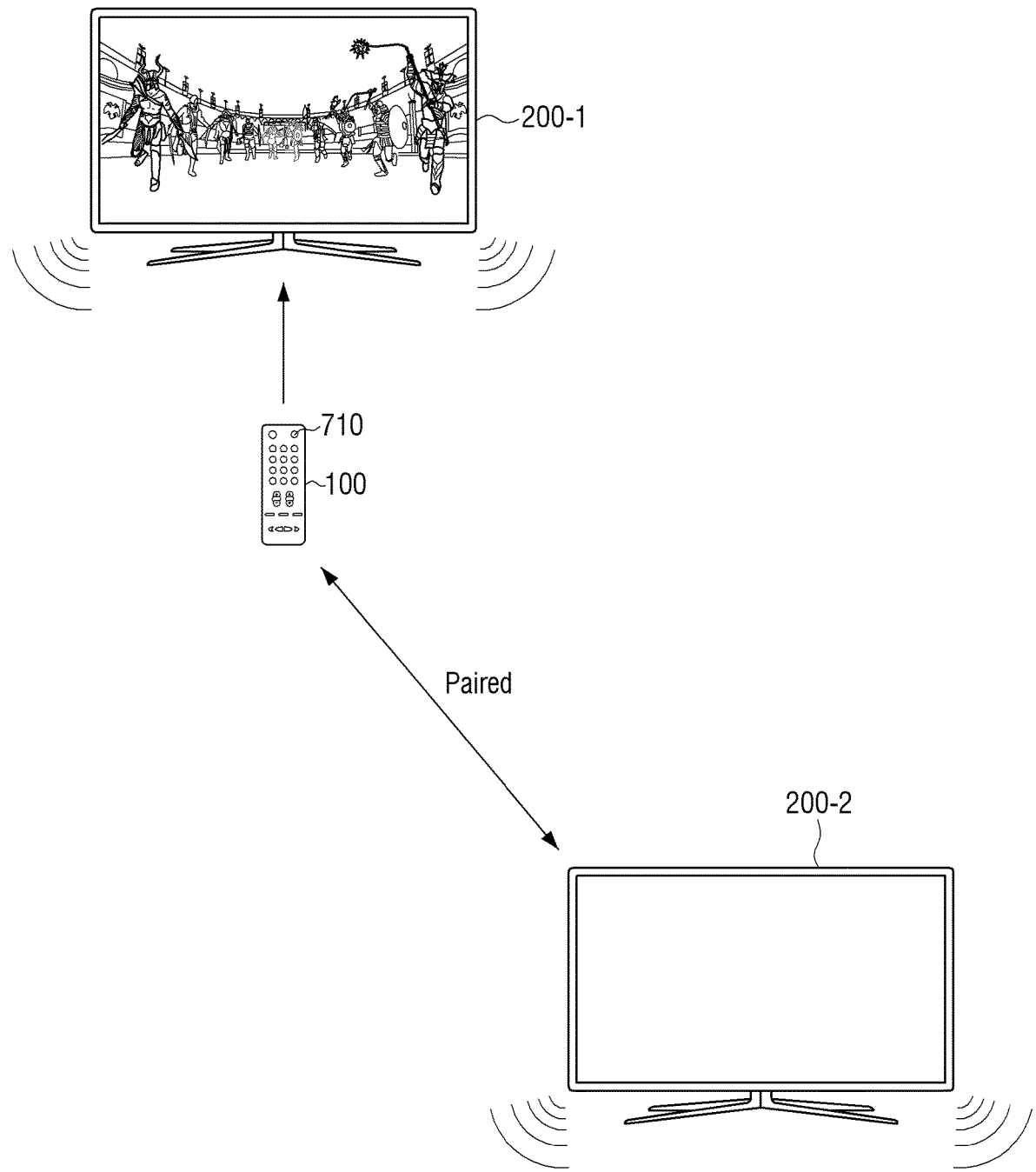
FIG. 7 is a diagram illustrating an example remote control apparatus including an additional button according to an embodiment.

FIG. 7 is a diagram illustrating an example remote control apparatus 100 including an additional button 710 according to an embodiment.

The method for turning on the electronic apparatus 200 by operating a general button of the remote control apparatus 100 has been described. However, in a case where the remote control apparatus 100 controls the first electronic apparatus 200-1 when paired with the second electronic apparatus 200-2 as shown in FIG. 7, it is not possible to operate with the generate button. This is because in a case of general button operation when the remote control apparatus 100 is paired with the second electronic apparatus 200-2, the third Bluetooth packet including the control command corresponding to the operated button may be transmitted to the second electronic apparatus 200-2

Therefore, the remote control apparatus 100 may further include an additional button 710. When in a case of the operation of the additional button 710, when the remote control apparatus 100 is paired with the second electronic apparatus 200-2, the remote control apparatus 100 may transmit the first Bluetooth packet requesting the output of the non-audible sound and release the pairing with the second electronic apparatus 200-2.

The remote control apparatus 100 may receive the non-audible sound output from the first electronic apparatus 200-1 and the non-audible sound output from the second electronic apparatus 200-2, but may disregard the non-audible sound output from the second electronic apparatus 200-2 that was paired in the operation. As a result, the remote control apparatus 100 may obtain identification information of the first electronic apparatus 200-2 from the non-audible sound output from the first electronic apparatus 200-1, and transmit the second Bluetooth packet including the obtained identification information to the first electronic apparatus 200-1. The first electronic apparatus 200-1 may turn on the first electronic apparatus 200-1 based on the second Bluetooth packet and may be paired with the remote control apparatus 100.

Although the first Bluetooth packet requesting the output of the non-audible sound is received, the second electronic apparatus 200-2 may not output the non-audible sound when paired with the remote control apparatus 100. The second electronic apparatus 200-2 may receive the first Bluetooth packet and release the pairing with the remote control apparatus 100. In addition, the remote control apparatus 100 may receive non-audible sound only from the first electronic apparatus 200-1, and may be paired with the first electronic apparatus 200-1.

FIG. 7 illustrates a situation in which the remote control apparatus 100 includes the additional button 710, but the remote control apparatus 100 may not include the additional button 710. In this case, the power button of the remote control apparatus 100 may be operated as the button for transmitting the first Bluetooth packet requesting the output of the non-audible sound.

For example, when the power button of the remote control apparatus 100 is operated, the remote control apparatus 100 may transmit the first Bluetooth packet requesting the output of the non-audible sound regardless of pairing. However, if the other buttons of the remote control apparatus 100, except for the power button, are operated, the remote control apparatus 100 may transmit the first Bluetooth packet requesting the output of the non-audible sound only if not paired.

When a user tries to control the first electronic apparatus 200-1 in a state where the remote control apparatus 100 is paired with the second electronic apparatus 200-2, the user may place the remote control apparatus 100 closer to the first electronic apparatus 200-1 than the second electronic apparatus 200-2, and operate the power button of the remote control apparatus 100.

In this case, the remote control apparatus 100 may transmit the first Bluetooth packet requesting the output of the non-audible sound to the first electronic apparatus 200-1 and the second electronic apparatus 200-2, and each of the first electronic apparatus 200-1 and the second electronic apparatus 200-2 may output the non-audible sound. The remote control apparatus 100 may receive a plurality of non-audible sounds, but may sense that the non-audible signal of the first electronic apparatus 200-1 located closer to the remote control apparatus is stronger. In addition, the remote control apparatus 100 may release the pairing with the second electronic apparatus 200-2, and perform pairing with the first electronic apparatus 200-1.

Figure 8:
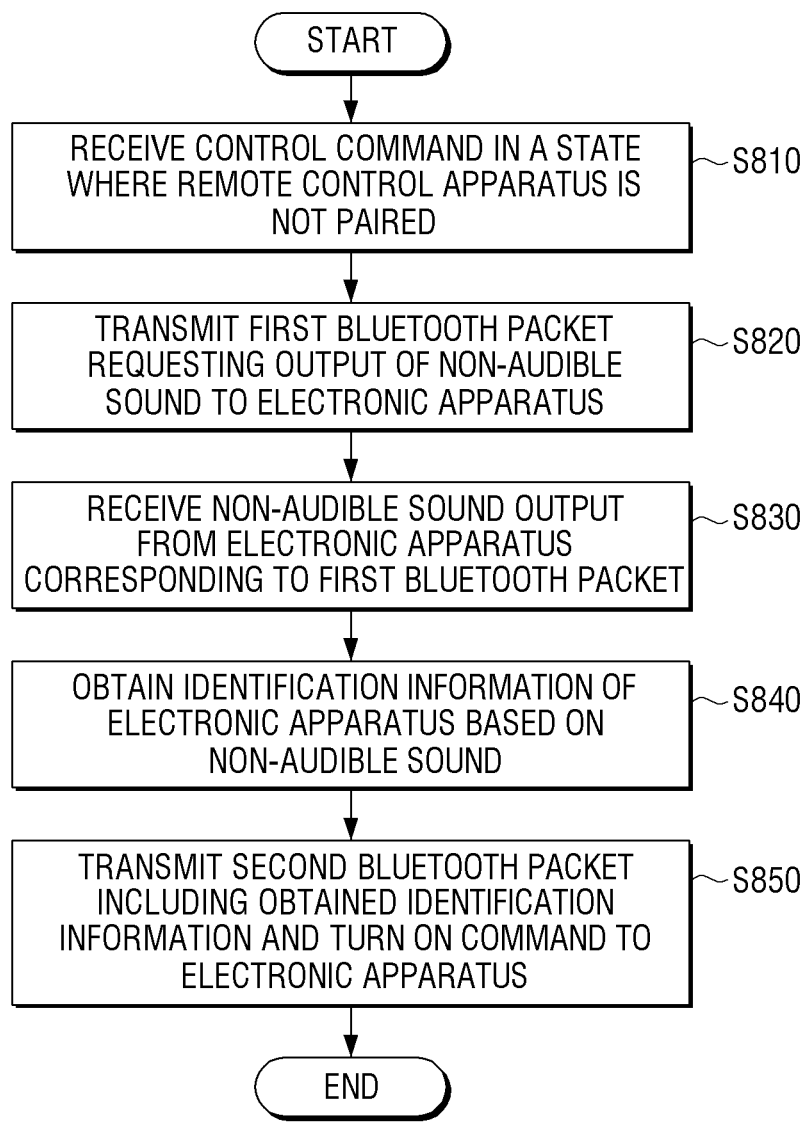
FIG. 8 is a flowchart illustrating an example method of controlling a remote control apparatus according to an embodiment.

FIG. 8 is a flowchart illustrating an example method of controlling a remote control apparatus according to an embodiment.

A control command may be received in a state where a remote control apparatus is not paired at step S810. However, the disclosure is not limited thereto. The remote control apparatus may receive a control command in a paired state, and in this case, may perform another operation according to the operated button.

A first Bluetooth packet requesting the output of a non-audible sound may be transmitted to the electronic apparatus at step S820. The non-audible sound output from the electronic apparatus corresponding to the first Bluetooth packet may be received at step S830. The identification information of the electronic apparatus may be obtained based on the non-audible sound at step S840. The second Bluetooth packet including the obtained identification information and a turn-on command may be transmitted to the electronic apparatus at step S850.

The receiving S830 may reeving a plurality of non-audible sounds after transmitting the first Bluetooth packet at step S830, and the receiving S840 may include obtaining identification information of the electronic apparatus from one of a plurality of non-audible sounds based on the time point of receiving of each of the plurality of non-audible sounds and the signal intensity.

When a control command is input in a state where a remote control apparatus is paired with an electronic apparatus, the transmitting of the third Bluetooth packet including the control command to the electronic apparatus may be further included.

The receiving S830 may further include receiving the non-audible sound by activating the microphone of the remote control apparatus during a predetermined period of time from the time point of transmitting the first Bluetooth packet.

When a control command is a turn-on command, the second Bluetooth packet may include the obtained identification information and a turn-on command, and when the control command is not a turn-on command, the second Bluetooth packet may include the obtained identification information, the turn-on command and the control command.

The first Bluetooth packet may be an undirected Bluetooth packet, and the second Bluetooth packet may be a directed Bluetooth packet.

According to various example embodiments of the disclosure, the remote control apparatus may control the electronic apparatus to output the non-audible sound using the Bluetooth packet without being paired with the display device, and when the non-audible sound is received, the electronic apparatus may be turned on to the Bluetooth packet including the identification information of the electronic apparatus included in the non-audible sound, which could not require an IR transceiver. Therefore, the manufacturing costs may be reduced.

According to an embodiment of the disclosure, various example embodiments described above may be embodied as the form of software, including instructions stored on machine-readable storage media readable by a machine (e.g., a computer). The machine may be an apparatus that calls a command stored in a storage medium and is operable according to the called command, including an electronic apparatus in accordance with the disclosed example embodiments (e.g., an electronic apparatus (A)). When the command is executed by a processor, the processor may perform the function corresponding to the command, either directly or under the control of the processor, using other components. The command may include code generated by a compiler or a code executed by an interpreter. The machine-readable storage medium may be provided in the form of a non-transitory storage medium. The 'non-transitory storage medium is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

The various embodiments described above may be implemented in a recording medium that can be read by a computer or a similar device using software, hardware, or any combination thereof. In some cases, embodiments described herein may be implemented by a processor itself. According to software implementation, embodiments such as the procedures and functions described herein may be implemented in separate software modules. According to some embodiments, software (e.g., the program) may contain one or more instructions that are stored in a machine (e.g., computer) readable storage medium (e.g., internal memory) or external memory. Each of the software modules may perform one or more of the functions and operations described herein.

Computer instructions for performing a processing operations of a device in accordance with various embodiments described above may be stored in a non-transitory computer-readable medium. The computer instructions stored in the non-transitory computer-readable medium may cause a particular device to perform the processing operation on the device according to various embodiments described above when executed by the processor of the particular device. The non-transitory computer readable medium refers to a medium that stores data, and is readable by an apparatus. For example, the above-described various applications or programs may be stored in a non-transitory computer readable medium such as, for example, and without limitation, a compact disc (CD), a digital versatile disk (DVD), a hard disk, a Blu-ray disk, a universal serial bus (USB) memory stick, a memory card, a read only memory (ROM), or the like.

Each of the components (e.g., modules or programs) according to various embodiments may include a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although various example embodiments have been illustrated and described, it will be appreciated by those skilled in the art that changes may be made to these embodiments without departing from the principles and spirit of the disclosure. Accordingly, the scope of the disclosure is not limited to the described embodiments, but may be defined, for example, by the appended claims as well as equivalents thereto.

What is claimed is:

1. A remote control apparatus, comprising:
an inputter comprising input circuitry;
a communicator comprising communication circuitry;
a microphone; and
a processor configured to:
control the communicator to transmit a first Bluetooth packet requesting an electronic device to output a non-audible sound based on a control command being input through the inputter in a state where the remote control apparatus is not paired,
obtain identification information of the electronic apparatus based on the nonaudible sound output by the electronic apparatus corresponding to the first Bluetooth packet being received through the microphone, and
control the communicator to transmit a second Bluetooth packet including the obtained identification information and a turn-on command to the electronic apparatus,
wherein the processor is further configured to, based on a plurality of non-audible sounds being received through the microphone after the first Bluetooth packet is transmitted, obtain the identification information of the electronic apparatus from one of the plurality of non-audible sounds based on a time point of receiving each of the non-audible sound of the plurality of non-audible sounds.

2. The apparatus as claimed in claim 1, wherein the processor is further configured to, based on a plurality of non-audible sounds being received through the microphone after the first Bluetooth packet is transmitted, obtain the identification information of the electronic apparatus from one of the plurality of non-audible sounds based on the time point of receiving each of the non-audible sound of the plurality of non-audible sounds and a signal intensity of each of the plurality of non-audible sounds.

3. The apparatus as claimed in claim 1, wherein the processor is further configured to control the communicator to transmit a third Bluetooth packet including the control command based on the control command being input through the inputter in a state where the remote control apparatus is paired with the electronic apparatus.

4. The apparatus as claimed in claim 1, wherein the processor is further configured to receive the non-audible sound by activating the microphone during a predetermined time period from a time point of transmitting the first Bluetooth packet.

5. The apparatus as claimed in claim 1, wherein the second Bluetooth packet includes the obtained identification information and the turn-on command based on the control command being the turn-on command, and
wherein the second Bluetooth packet includes the obtained identification information, the turn-on command, and the control command based on the control command not being the turn-on command.

6. The apparatus as claimed in claim 1, wherein the first Bluetooth packet comprises an undirected Bluetooth packet, and
wherein the second Bluetooth packet comprises a directed Bluetooth packet.

7. An electronic system, comprising:
a remote control apparatus configured to transmit a first Bluetooth packet requesting an electronic apparatus to output a non-audible sound based on a control command being input in a non-paired state; and
an electronic apparatus configured to output a non-audible sound including identification information of an electronic apparatus based on the first Bluetooth packet based on the first Bluetooth packet requesting the output of the non-audible sound being received,
wherein the remote control apparatus is further configured to:
obtain the identification information of the electronic apparatus based on the non-audible sound output by the electronic apparatus corresponding to the first Bluetooth packet being received, and
transmit a second Bluetooth packet including the obtained identification information and a turn-on command to the electronic apparatus, and
wherein the electronic apparatus is configured to turn on based on a second Bluetooth packet including the identification information being received,
wherein the remote control is further configured to, based on a plurality of non-audible sounds being received through a microphone after the first Bluetooth packet is transmitted, obtain the identification information of the electronic apparatus from one of the plurality of non-audible sounds based on a time point of receiving each of the non-audible sound of the plurality of non-audible sounds.

8. The electronic system as claimed in claim 7, wherein the remote control apparatus is further configured to transmit a third Bluetooth packet including the control command to the electronic apparatus based on the control command being input in a state where the remote control apparatus is paired with the electronic apparatus.

9. The electronic system as claimed in claim 7, wherein the remote control apparatus is further configured to receive the non-audible sound by activating a microphone of the remote control apparatus during a predetermined time period from a time point of transmitting the first Bluetooth packet.

10. The electronic system as claimed in claim 7, wherein the second Bluetooth packet includes the obtained identification information and the turn-on command based on the control command being the turn-on command, and wherein the second Bluetooth packet includes the obtained identification information, the turn-on command, and the control command based on the control command not being the turn-on command.

11. The electronic system as claimed in claim 7, wherein the first Bluetooth packet comprises an undirected Bluetooth packet, and wherein the second Bluetooth packet comprises a directed Bluetooth packet.

12. The electronic system as claimed in claim 7, wherein the electronic apparatus is further configured to:

turn on the electronic apparatus and perform pairing with a remote control apparatus which transmits the second Bluetooth packet based on the second Bluetooth packet being received in a turn-off state, and perform pairing with the remote control apparatus based on the second Bluetooth packet being received in a turn-on state.

13. A method of controlling a remote control apparatus that controls an electronic apparatus, the method comprising:

receiving a control command in a state where the remote control apparatus is not paired;

transmitting a first Bluetooth packet requesting the electronic apparatus to output a non-audible sound;

receiving the non-audible sound output by the electronic apparatus corresponding to the first Bluetooth packet;

obtaining identification information of the electronic apparatus based on the non-audible sound; and transmitting a second Bluetooth packet including the obtained identification information and a turn-on command, wherein the receiving comprises receiving a plurality of non-audible sounds after transmitting the first Bluetooth packet, and wherein the obtaining comprises obtaining the identification information of the electronic apparatus from one of the plurality of non-audible sounds based on a time point of receiving each of the non-audible sound of the plurality of non-audible sounds.

14. The method as claimed in claim 13, wherein the obtaining comprises obtaining the identification information of the electronic apparatus from one of the plurality of non-audible sounds based on at least one of the time point of receiving each of the non-audible sound of the plurality of non-audible sounds and a signal intensity of each of the plurality of non-audible sounds.

15. The method as claimed in claim 13, further comprising:

transmitting a third Bluetooth packet including the control command to the electronic apparatus based on the control command being input in a state where the remote control apparatus is paired with the electronic apparatus.

16. The method as claimed in claim 13, wherein the receiving comprises receiving the non-audible sound by activating the microphone of the remote control apparatus during a predetermined time period from a time point of transmitting the first Bluetooth packet.

17. The method as claimed in claim 13, wherein the second Bluetooth packet includes the obtained identification information and the turn-on command based on the control command being the turn-on command, and wherein the second blue-tooth packet includes the obtained identification information, the turn-on command, and the control command based on the control command not being the turn-on command.

18. The method as claimed in claim 13, wherein the first Bluetooth packet comprises an undirected Bluetooth packet, and wherein the second Bluetooth packet comprises a directed Bluetooth packet.

* * * * *